3,255,130
ETHYLENE PROPYLENE COPOLYMER LATICES CONTAINING POLAR GROUPS
Gerald I. Keim, West Grove, Pa., and Stearns T. Putnam, Wilmington, Del., assignors to Hercules Powder Company, Wilmington, Del., a corporation of Delaware
No Drawing. Continuation of application Ser. No. 113,616, May 31, 1961. This application Aug. 25, 1965, Ser. No. 482,613
11 Claims. (Cl. 260—8)

This is a continuation of our copending U.S. application Serial No. 113,616, filed May 31, 1961, now abandoned.

The present invention relates to latices of modified ethylene-propylene copolymers and, more particularly, to high solids latices of ethylene-propylene copolymers modified by the attachment thereto of a plurality of polar groups, and to the use of same as coating adhesives in paper coating color compositions.

The use of high solids ethylene-propylene latices as coating adhesives for paper has been attended with difficulties for several reasons. For example, the adhesion of such copolymers to polar surfaces is only fair. Another reason is that in order to obtain stable latices such high concentrations of dispersing agents must be used as to be incompatible with the copolymer and prevent the formation of coherent coatings.

It has now been discovered that by attaching a plurality of polar groups to an ethylene-propylene copolymer, the resulting modified copolymer can be used to form latices which are particularly useful as coating adhesives in paper coating color compositions.

Accordingly, this invention relates to a latex of an ethylene-propylene copolymer modified by the attachment thereto of a plurality of polar groups, to a paper coating color composition prepared from said latex, and to paper coated with said coating color.

The ethylene-propylene copolymers useful in the practice of this invention are the normally solid copolymers. These copolymers are materials known to the art which can be prepared by copolymerizing ethylene with propylene by any of several methods, such as the methods described in Belgian Patents 535,082; 538,782; 553,655; and 583,039; and U.S. Patents 2,700,663 and 2,726,231. Those copolymers containing from about 21% to about 55% by weight propylene and having a reduced specific viscosity (RSV) of from about 0.8 to about 8.0 are most useful in this invention.

The term "reduced specific viscosity," which is a function of molecular weight, is used herein to designate the $\eta sp/c$ determined on a 0.1% solution of the copolymer in decahydronaphthalene measured at 135° C.

It will be understood, of course, that the polymers of other α-olefins having essentially equivalent properties can be used in place of the ethylene-propylene copolymers. For example, the homopolymers and copolymers of butene-1, pentene-1, etc., with ethylene, can be used to replace the ethylene-propylene copolymers in the modified latices of this invention. These polymers can be prepared by the same general methods used to prepare the copolymers of ethylene and propylene.

Any polar compound, that is, any organic or inorganic compound which when reacted with an ethylene-propylene copolymer affords polar groups, can be used in the practice of this invention. Exemplary of the polar compounds that can be used are the organic unsaturated polar compounds such as maleic anhydride, methacrylic acid, acrylic acid, methyl acrylate, acrylamide, acrylonitrile, allyl alcohol, allylamine, vinyl pyridine, etc., and the inorganic polar compounds, as, for example, phosphorus halides such as phosphorus trichloride; alkali sulfites such as sodium sulfite; alkali bisulfites such as sodium bisulfite; etc. These polar compounds can be reacted with an ethylene-propylene copolymer by a free-radical mechanism using a compound capable of supplying free radicals at a given temperature and sufficient heat to insure that free radicals will be formed. Exemplary of the attachment of polar groups are the following equations:

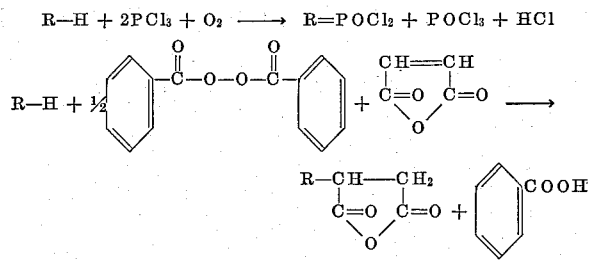

R–H being an ethylene-propylene copolymer in each equation. The compound used to supply free radicals and the temperature of the reaction will depend on the polar compound being reacted and can readily be determined by one skilled in the art. The number of polar groups required to improve the properties of an ethylene-propylene copolymer so that it may be used in coating color compositions varies over a wide range. However, in general, a sufficient number of polar groups will be attached when from about 0.05% to about 2.0% by weight of polar compound is reacted with an ethylene-propylene copolymer. Amounts substantially in excess of 5% by weight do not improve adhesion sufficiently to warrant the increased cost.

The latices of this invention can be prepared by any one of a number of procedures. One convenient procedure is to prepare a solution of the modified ethylene-propylene copolymer and then form an oil-in-water emulsion by mixing with water and a small amount of surface-active agent. The oil-in-water emulsion can then be stripped of the organic solvent or solvents by steam distillation to give a dilute latex. This latex can, if desired, be concentrated by known methods. Latices having various total solids contents can be prepared; however, the total solids content will usually be from about 40% to about 60% solids.

In the preparation of a coated paper, it is conventional to prepare a mixture of water and a pigment, such as clay or the like, optionally together with other materials such as, for example, a soluble pyrophosphate which may act as a stabilizing agent. This mixture, otherwise known as a pigment slip or, since it generally contains clay, as a clay slip, is then compounded with a binder or coating adhesive, such as starch, to produce a composition known in the art as a coating color which is useful for coating paper. Considerable quantities of the coating adhesive are used, and, accordingly, its composition and characteristics are of great importance in determining the quality of the finished paper. Important properties of the coating adhesive are that it must impart to the finished paper a high degree of brightness, smoothness and gloss, and a good finish and feel after calendering. In addition to these basic qualities, there are various other characteristics that go far toward determining the value and utility of coating adhesives: (1) the coating color must flow smoothly and evenly so that it may be applied to paper at sufficiently high speeds to be economical in ordinary coating processes and (2) the coating must have high strength to permit subsequent printing on the coated paper without "picking."

Now, in accordance with the present invention, there is utilized as a coating adhesive a composition of matter comprising a latex of an ethylene-propylene copolymer modified by the attachment thereto of a plurality of polar groups. This latex is mixed with a pigment slip and, optionally, other ingredients to form a coating color which when coated on a paper surface provides brightness, smoothness and gloss, a good finish and feel after calendering, and high strength.

For optimum results in the coating of paper, it is preferred to prepare a coating color having a total solids composition which is relatively high, thus combining surface coating qualities with economical operations. Since the modified latices of the invention reduce the viscosity of coating colors, it is possible to use higher solids colors and, hence, to coat at a faster rate without increasing the drying capacity of the machine. A preferred range of total solids for the coating color is between about 30% and about 70% solids with an optimum value of from about 50% to about 65%. If the modified latex is used as the sole adhesive in the coating color, it will be present in an amount between about 5% and about 25%, based on the weight of clay, and preferably between about 6% and about 18%. A composition containing an amount of total solids and adhesive in this range is characterized by being readily applied to the surface of paper and by forming a highly resistant coating thereon. Thus, utilizing the coating color according to this invention there is produced a coated paper which is highly satisfactory for use in printing operations and is resistant to disturbance of the coated surface through rubbing, picking and the like. The latices of this invention can be used as the sole adhesive or merely to replace a part of the adhesive (starch or casein) in a conventional coating color. Where the modified latices are used to replace a part of the starch or casein in a conventional coating color they will be present in an amount of at least 10% by weight based on total adhesives.

In place of the clay utilized as the pigment, there can be used other paper coating compositions and materials such as, for example, calcium carbonate, titanium dioxide, or other coating pigments alone or preferably with a clay base. The modification of the coating color using these materials will be within the knowledge of those skilled in the art.

The utility of the coating color is not limited to the type of paper pulp used, and, accordingly, it can be utilized with the various types of kraft, soda, sulfite pulp, and the like, as well as with the various chemical and semi-chemical paper pulps. By the same token, the invention can be utilized with various types of paper products such as paper, fiber board and the like. In all instances, the product produced is characterized by being relatively resistant to abrasion and having a surface of improved printing properties.

The general nature of the invention having been set forth hereinbefore, the following examples are presented for purposes of illustration, parts and percentages being by weight unless otherwise stated.

The Hercules Print Tester mentioned in the examples is an instrument developed for measuring the picking resistance of coated printing papers. The instrument embodies the basic principles of a printing press. Small strips of the test specimen are printed with an ink-like material under controlled conditions. The speed of printing is increased by small increments until picking of a test strip occurs. For a more complete description of the print tester, see E. J. Barber et al., TAPPI, vol. 34, No. 10, October 1951, published by Technical Association of the Pulp and Paper Industry.

*Example 1*

An ethylene-propylene copolymer having an RSV of 1.3 and a propylene content of 24.9 mole percent was prepared in chlorobenzene using a catalyst of diethylaluminum chloride and tert-butyl orthovanadate. The resulting chlorobenzene solution had a solids content of 5.34%.

To 528 parts of the above chlorobenzene solution (which contained 28.2 parts of ethylene-propylene copolymer) was added 1.35 parts of maleic anhydride and 1.67 parts of benzoyl peroxide. The reaction mixture was agitated for 6 hours at a temperature of 50° C. and then cooled to 25° C. Then 200 parts of the resulting solution was emulsified by adding a solution of 1.5 parts of an alkyl sulfate anionic surface-active agent in 11.5 parts of 3.5% aqueous sodium hydroxide and vigorously agitating. After 5 minutes, 75 additional parts of water were added and the water-in-oil emulsion inverted to form an oil-in-water emulsion having a pH of 7.4. From this emulsion a dilute latex was formed by steam stripping the chlorobenzene. The resulting latex had a solids content of 4.02% and an average particle size of <0.5 micron. It was concentrated by mixing with 28 parts of a 1% aqueous solution of carboxymethylcellulose and allowed to stand overnight. Two layers formed. The bottom layer, essentially water, was removed leaving a latex containing 58.6% solids.

A latex was prepared from the unmodified ethylene-propylene copolymer as described above except that 1.25 times the amount of surface-active agent was required to form the intermediate emulsion.

A clay slip was prepared by mixing 100 parts of fine kaolin coating clay with 40 parts of water and 0.3 part sodium pyrophosphate. After agitating several minutes, a smooth suspension was obtained. To 73 parts of the clay slip was added 17.1 parts of the above-modified latex and a small amount of anticoagulant to yield a smooth coating color containing 60% solids. A similar coating color was prepared from the latex containing unmodified copolymer in the exact same manner.

The thus prepared coating colors were coated on several sheets of ledger stock using a standard paper coating machine and dried on a drum dryer to a moisture content of 6%. Coating weights of 5 lbs./ream were used. Each sheet was tested on the Hercules Print Tester using a viscosity rated printing ink. The coating color prepared with modified ethylene-propylene copolymer failed at a printing speed of 4, while the coating color prepared with unmodified ethylene-propylene copolymer failed at a printing speed of 1. The coating containing modified ethylene-propylene copolymer had very good wet-rub resistance as determined by rubbing a moistened surface across the coated paper and then placing the surface against a piece of black paper. The amount of coating color which was rubbed off the paper onto the test surface and subsequently transferred to the black paper was a qualitative indication of the wet-rub resistance of the paper.

*Example 2*

An ethylene-propylene copolymer having an RSV of 2.3 and a propylene content of 21 mole percent was prepared in chlorobenzene using the catalyst described in Example 1. The resulting chlorobenzene solution had a solids content of 5.32%.

To 500 parts of the above chlorobenzene solution was added 1.64 parts of maleic anhydride and 1.94 parts of benzoyl peroxide. The reaction was agitated for 2½ hours at a temperature of 50° C., cooled to 25° C., and washed 4 times with water to remove any unreacted maleic anhydride.

The solution of copolymer was then converted to a latex and tested as a coating color adhesive as described in Example 1.

A conventional coating color composition was prepared from a styrene-butadiene copolymer latex (containing 60 mole percent styrene) and tested under identical conditions. The coating color prepared with modified ethylene-propylene copolymer performed as well as the standard coating color prepared with styrene-butadiene copolymer in printing speed tests.

*Example 3*

An ethylene-propylene copolymer having an RSV of 2.0 and a propylene content of 26 mole percent was prepared in chlorobenzene using a catalyst of tert-butyl orthovanadate and diethylaluminum chloride. When the solution had a solids content of 4%, the reaction was halted by adding 11% (by weight, based on copolymer content) of phosphorus trichloride.

The reaction vessel was evacuated, flushed with nitrogen, evacuated again, and then filled with oxygen. After agitating for 90 minutes a small amount of diethanolamine was added and the reaction agitated an additional 10 minutes. The resulting product had a solids content of 4%. An analysis of the modified copolymer showed that it contained 0.46% phosphorus and 0.38% nitrogen. While its exact structure was not known, it was thought to contain phosphonamide groups.

The modified copolymer and the unmodified copolymer from which it was prepared were each converted to a latex and then tested as coating color adhesives. The coating color prepared from modified copolymer had better adhesion for paper than the one prepared from unmodified copolymer.

*Example 4*

Four coating color compositions, designated A, B, C, and D for identification, were prepared from an ethylene-propylene copolymer containing 29 mole percent propylene and having an RSV of 3.1 as follows:

(A) To 800 parts of a 5% solution of the above copolymer in chlorobenzene was added 0.2 part of maleic anhydride at 50° C. After the anhydride dissolved, 0.4 part of benzoyl peroxide was added. The reaction was agitated for 4 hours at 50° C. and then cooled and washed with aqueous sodium carbonate and then water.

(B) The procedure of A was repeated except 0.4 part of maleic anhydride and 0.8 part of benzoyl peroxide were used.

(C) To 800 parts of a 5% solution of the above copolymer in chlorobenzene was added 1.2 parts of allylamine at 50° C. After the allylamine dissolved, 5.1 parts of benzoyl peroxide was added. The reaction was agitated for 4 hours at 50° C. and then cooled and washed with water to remove unreacted amine and benzoyl peroxide.

(D) A 5% solution of the above copolymer in chlorobenzene was prepared to be used as a control.

Latices of A, B, C, and D described above were prepared as follows: To 175 parts of each solution except D was added 4 parts of a 20% aqueous solution of alkyl sulfate anionic surface-active agent (sodium lauryl sulfate) with vigorous agitation. Solution D required 10 parts of the surface-active agent for emulsification. After 1 minute agitation, 100 additional parts of water was added and each water-in-oil emulsion inverted to form an oil-in-water emulsion. From these emulsions dilute latices were formed by steam stripping the chlorobenzene solvent. The resulting latices had a solids content of 5%. Each dilute latex was concentrated by mixing with 19.2 parts of a 1% aqueous solution of carboxymethylcellulose and allowed to stand until two layers formed. In each case the bottom layer was essentially water which was removed leaving latices having a solids content of about 50%.

Coating color compositons were prepared from the above latices as follows: To each 6.7 parts of latex was added 0.5 part of 20% aqueous sodium caseinate solution, and then each latex was added to a blend of 80 parts of 70% clay slip, 0.7 part sodium pyrophosphate, and 33.6 parts of a 20% aqueous starch solution. Each of the resulting coating colors were then coated on ledger stock and tested as described in Example 1. The results are tabulated below.

| Sample: | Failing speed, Hercules Print Tester |
|---|---|
| A | 5 |
| B | 6 |
| C | 6 |
| D (control) | 2 |

*Example 5*

There coating color compositions, designated A, B, and C for identification, were prepared from an ethylene-propylene copolymer containing 43 mole percent propylene and having an RSV of 3.0 as follows:

(A) To 600 parts of a 5% solution of the above copolymer in a hydrocarbon solvent (97.1% saturated and having a boiling range of 94°–99° C.) was added 1.5 parts of allylamine and 6.36 parts of benzoyl peroxide at 50° C. The reaction was agitated for 4 hours at 50° C. and then cooled and washed with water.

(B) To 600 parts of a 6.25% solution of the above copolymer in chlorobenzene was added 1.87 parts of 2-vinyl pyridine and 4.32 parts of benzoyl peroxide at 50° C. The reaction was agitated for 4 hours at 50° C. and then cooled and washed with water.

(C) A 5% solution of the above copolymer in chlorobenzene was prepared to be used as a control.

Latices and then coating color compositions were prepared from the above solutions as described in Example 4. Each of the resulting coating colors was then coated on ledger stock and tested as described in Example 1. The results are tabulated below.

| Sample: | Failing speed, Hercules Print Tester |
|---|---|
| A | 6 |
| B | 5 |
| C (control) | 3 |

In addition to being useful as coating adhesives for paper, the latices of this invention can be used in the preparation of tire cord coating compositions, emulsion paints, resilient concrete, binder for cork, wood, leather buffings, etc.

What we claim and desire to protect by Letters Patent is:

1. A latex of an ethylene-propylene copolymer modified by the attachment thereto of a plurality of polar groups, said polar groups having been attached by reacting said copolymer with a polar compound selected from the group consisting of maleic anhydride, methacrylic acid, acrylic acid, methyl acrylate, acrylamide, acrylonitrile, allyl alcohol, allylamine, vinyl pyridine, phosphorus halides and alkali sulfites, said copolymer having an RSV of from about 0.8 to about 8.0 and said polar groups not being substantially in excess of 5% by weight of the copolymer.

2. The composition of claim 1 wherein the polar groups are attached by reacting the ethylene-propylene copolymer with maleic anhydride.

3. The composition of claim 1 wherein the polar groups are attached by reacting the ethylene-propylene copolymer with allylamine.

4. The composition of claim 1 wherein the polar groups are attached by reacting the ethylene-propylene copolymer with 2-vinyl pyridine.

5. The composition of claim 1 wherein the polar groups are attached by reacting the ethylene-propylene copolymer with phosphorus trichloride.

6. A paper coating color comprising an aqueous dispersion of substantial quantities of a paper coating pigment and an adhesive, said adhesive containing at least 10% by weight of a latex of an ethylene-propylene copolymer modified by the attachment thereto of a plurality of polar groups, said polar groups having been attached by reacting said copolymer with a polar compound selected from the group consisting of maleic anhydride, methacrylic acid, acrylic acid, methyl acrylate, acrylamide, acrylonitrile, allyl alcohol, allylamine, vinyl pyridine, phosphorus halides and alkali sulfites, said copolymer having an RSV of from about 0.8 to about 8.0 and said polar groups not being substantially in excess of 5% by weight of the copolymer.

7. The composition of claim 6 wherein said adhesive is a mixture of starch and at least 10% by weight of said latex.

8. The composition of claim 6 wherein said adhesive is a mixture of casein and at least 10% by weight of said latex.

9. The composition of claim 6 wherein said adhesive is essentially entirely said latex.

10. In a process of coating a paper with a coating color comprising an aqueous dispersion of substantial quantities of a paper coating pigment and an adhesive, the improvement of using an adhesive containing at least 10% by weight of a latex of an ethylene-propylene copolymer modified by the attachment thereto of a plurality of polar groups, said polar groups having been attached by reacting said copolymer with a polar compound selected from the group consisting of maleic anhydride, methacrylic acid, acrylic acid, methyl acrylate, acrylamide, acrylonitrile, allyl alcohol, allylamine, vinyl pyridine, phosphorus halides and alkali sulfites, said copolymer having an RSV of from about 0.8 to about 8.0 and said polar groups not being substantially in excess of 5% by weight of the copolymer.

11. A coated paper comprising a paper web having on the surface a coating comprising a paper coating pigment and an adhesive, said adhesive containing at least 10% by weight of a latex of an ethylene-propylene copolymer modified by the attachment thereto of a plurality of polar groups, said polar groups having been attached by reacting said copolymer with a polar compound selected from the group consisting of maleic anhydride, methacrylic acid, acrylic acid, methyl acrylate, acrylamide, acrylonitrile, allyl alcohol, allylamine, vinyl pyridine, phosphorus halides and alkali sulfites, said copolymer having an RSV of from about 0.8 to about 8.0 and said polar groups not being substantially in excess of 5% by weight of the copolymer.

No references cited.

WILLIAM H. SHORT, *Primary Examiner.*